United States Patent [19]
Ebert et al.

[11] Patent Number: 4,559,816
[45] Date of Patent: Dec. 24, 1985

[54] DISPLACEMENT TRANSDUCER FOR DETECTING THE POSITION OF AN ADJUSTING DEVICE

[75] Inventors: Rolf Ebert, Lauffen; Peter Knorreck, Weissach; Manfred Krämer, Schwieberdingen; Wilfried Merkel, Kappelrodeck, all of Fed. Rep. of Germany

[73] Assignee: Robert Bosch GmbH, Stuttgart, Fed. Rep. of Germany

[21] Appl. No.: 591,135

[22] Filed: Mar. 19, 1984

[30] Foreign Application Priority Data

Apr. 15, 1983 [DE] Fed. Rep. of Germany ....... 3313715
Apr. 15, 1983 [DE] Fed. Rep. of Germany ....... 3313716
Oct. 28, 1983 [DE] Fed. Rep. of Germany ....... 3339077

[51] Int. Cl.$^4$ .......................................... G01M 15/00
[52] U.S. Cl. .................................................. 73/119 A
[58] Field of Search ..................... 73/119 A; 123/343; 338/13

[56] References Cited

U.S. PATENT DOCUMENTS 2,642,047 6/1953 Johnson ........................ 73/119 A X
4,455,868 6/1984 Kampichler ...................... 73/119 A Primary Examiner—Jerry W. Myracle
Attorney, Agent, or Firm—Edwin E. Greigg

[57] ABSTRACT

A displacement pickup for detecting positions of an adjusting device, in particular an adjusting device of fuel injection pumps. In an advantageous manner, an adjustment of the displacement pickup can be performed with the aid of a cylindrical tang, which is displaceable and fixable in a through bore in the wall of a housing receiving the adjusting device and through the interior of which an adjusting device of the displacement pickup can be adjusted from outside the housing. In a displacement pickup advantageously embodied as a rotary potentiometer, a contact means of a resistor ($R_a$) of the resistance course of the potentiometer can thus be adjusted.

24 Claims, 5 Drawing Figures

DISPLACEMENT TRANSDUCER FOR DETECTING THE POSITION OF AN ADJUSTING DEVICE

BACKGROUND OF THE INVENTION

The invention relates to a displacement pickup for detecting the position of an adjusting device.

From German Auslegeschrift No. 1 265 489, it is known to detect the position of a linearly adjustable governor rod of a fuel injection pump with the aid of a potentiometer. With the aid of a wiper that is moved linearly together with the governor rod, a measurement voltage is picked up from a linearly extending resistance path. The displacement pickup thereby disclosed for detecting the position of the governor rod is disposed outside the fuel injection pump, however, and because of its structure, it requires a relatively large amount of space. Another disadvantage is that the housing of the fuel injection pump must be opened in order for the displacement pickup to be set and adjusted.

OBJECT AND SUMMARY OF THE INVENTION

The displacement pickup according to the invention has the advantage over the prior art that the setting of the stationary pickup part in its association with the movable pickup part takes place with the fuel injection pump, or as applicable with the housing of the apparatus receiving the displacement pickup closed. In an advantageous manner, the displacement pickup can be accommodated in the interior of the housing, protected from any external mechanical influence, without any additional expense for mounting or setting; this lengthens its expected service life and reduces the cost for servicing the pickup.

As a result of one embodiment shown herein, a favorable opportunity is afforded of performing an additive adjustment of the pickup. Easy mounting and setting of the pickup are thereby attained.

One embodiment is distinguished by favorable manufacturing features, and assures reliable sealing of the housing from the outside. It is particularly advantageous that a multiplicative adjustment can be performed from outside the housing on the displacement pickup when the latter is in its mounted state.

The displacement pickup has a further advantage in that it has a small structure known from rotary potentiometers and that only a shaft is provided as a movable part on the housing, so that bearing and sealing problems for sealing off the pickup housing are reduced to a minimum.

The displacement pickup has an advantage that it has a small structure known from rotary potentiometers and that as the movable part, only a pivot point is provided, so that bearing and sealing problems are reduced to a minimum. Without requiring corrections of the output signal of a rotary potentiometer intended to detect a linear adjusting movement [i.e. if the rotary potentiometer is used to detect linear movement its output signal must be corrected], all the other advantages offered by a rotary potentiometer are also attained by the embodiment according to the invention. Among this is in particular the accurate guidance of the wiper pickups.

By means of an embodiment set forth a favorable opportunity is further afforded of protecting the resistance path of the displacement pickup from contamination that would affect the measured resistance value.

Further advantageous embodiments of the apparatus disclosed are also attainable by means of the characteristics disclosed herein. In particular, it is possible with the embodiments shown to use various arbitrary displacement pickups, such as inductive transducers, short-circuit-ring transducers, proximity transducers or Hall-effect transducers, while attaining the advantages initially discussed above.

The invention will be better understood and further objects and advantages thereof will become more apparent from the ensuing detailed description of a preferred embodiment taken in conjunction with the drawings.

DESCRIPTION OF THE EXEMPLARY EMBODIMENT

Figure 1:
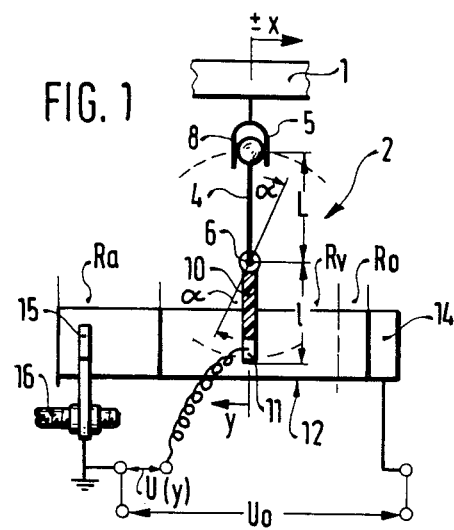
FIG. 1 shows the basic design of the displacement pickup according to the invention.

FIG. 1 shows a portion of an adjusting device 1, which may for instance be some intermediate part of a governor rod of a fuel injection pump. This adjusting device executes a linear movement in amounts of x. The instantaneous position of this adjusting device is detected with the aid of a displacement pickup 2. This element has an actuating lever 4 of a length L, which on its outermost end engages a coupling 5 of the adjusting device and is pivotable about a pivot point 6, which rests for example on a shaft 7 (see FIG. 3). The coupling 5 permits an accurate guidance of the end of the actuating lever in the direction of movement of the adjusting device and a displacement of the end of the actuating lever at right angles to the movement of the adjusting device. The coupling may be realized as a fork, groove or oblong slot, by way of example, and the end of the actuating lever may have a ball 8, a tang or an articulated link.

A lever 10 is connected rigidly with the actuating lever 4; it is pivotable about the same pivot point or about the shaft 7 and has on its end a wiper 11. The lever 10 is made of insulating material, or else the wiper 11 is attached to the lever 10 such that it is insulated with respect to the lever 10. The wiper 11 is in continuous contact with a resistance path 12, which is part of a resistance surface of the displacement pickup. The resistance path is wide enough that the wiper remains continuously in contact with the resistance path during any possible pivoting movement of the lever 10. The resistance path has a linear extension; at one end it has a fixed contact means 14 and at the other end it has a displaceable contact means 15. The resistance path acts as a resistance surface, comprising a base resistance $R_0$, which is connected directly to the fixed contact means; an adjacent resistance path region $R_p$, in which the wiper 11 is effective; and a path resistance region $R_a$, as an adjusting resistance for multiplicatively influencing the displacement signal picked up at the wiper 11. The contact means 14 and 15 are connected to a voltage source $U_o$, and it is advantageous if the displaceable contact, which is displaceable via an adjusting screw 16, is selected as the ground. Between ground and the wiper 11, a voltage U (y) can then be picked up, which represents a value for the position of the wiper 11 on the resistance path $R_v$ or for the position of the adjusting device 1.

Figure 2:
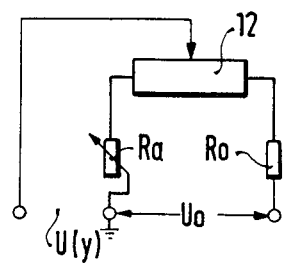
FIG. 2 is a circuit diagram of the displacement pickup according to the invention.

FIG. 2 is a substitute circuit diagram for the disposition shown in FIG. 1, but in which instead of a resistor $R_o$ in the form of a part of the resistance path, a conventional resistor is connected at the input side, and instead of the resistance path part $R_a$ a conventional adjusting resistor is used. With a solution of this kind, the structural shape can be reduced, particularly in the longitudinal length of the resistance path 12.

With the apparatus described, the displacement variable x of the adjusting device is first converted to an angle of rotation α and this angle is then linearized once again by the pickup of a voltage value on a linear resistance path. In rotary potentiometers that are otherwise conventionally used, the resistance path is embodied as circular, corresponding to the pivoting movement of the lever 10, such that a corresponding partial resistance value of the resistance path is associated with each angle of rotation α. However, the output signal of such a potentiometer must then be linearized again by expensive means, if it is used for detecting a linear movement x. Such provisions are unnecessary with the embodiment according to the invention.

Figure 4:
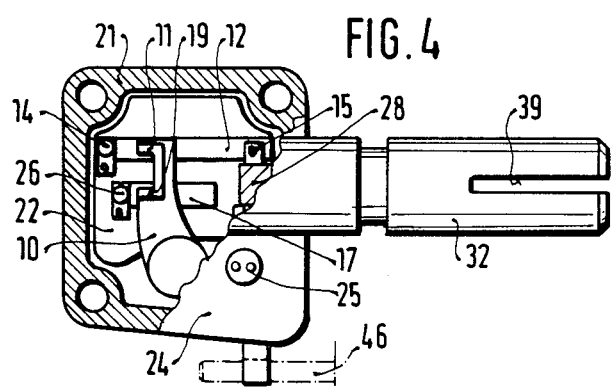
FIG. 4 is a section taken through the exemplary embodiment in a plane at right angles to the view shown in FIG. 3.
Figure 5:
FIG. 5 is a partial section taken through the carrier plate for the resistance path and the contact path.

In a conventional manner, in order to pick up the voltage value on the resistance path 12, a contact path 17 can be associated therewith and parallel to it, and the wiper 11 may be connected with a second wiper 19 which is likewise disposed on the lever 10 and which is in continuous contact with the contact path 17. In FIG. 4, a form of embodiment of the displacement pickup is shown in a partial section. This pickup substantially comprises a housing 21, in the interior of which a carrier plate 22 of insulating material is disposed. A resistance course is applied to the carrier plate in the form of the resistance path 12 shown in FIG. 1. At one end, the resistance path 12 has a contact means 14, the voltage supply of which is effected as shown in FIG. 5 via a conductor 23, which is cast integrally with the carrier plate, and the other end of which is conducted to the outside at the location marked 25 in a sealed manner through a cap 24 of the housing 21. A corresponding contact means 26 has the one end of the contact path 17 likewise applied to the carrier plate 22 as well as a corresponding connection at location 25 of the cap 24.

The displaceable contact means 15 can in this embodiment either be connected to ground or secured in an insulated manner on a sliding member 28 and connected via a conductor with a connection at location 25. The resistance path is advantageously fabricated from electrically conductive plastic, thereby substantially reducing frictional resistances and wear.

Figure 3:
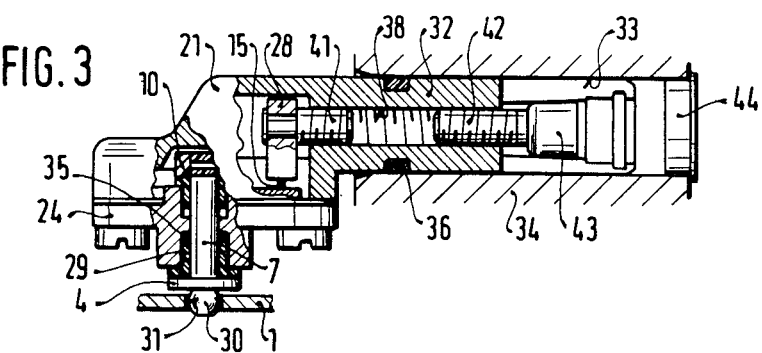
FIG. 3 shows partial sections through one form of an embodiment of the displacement pickup according to the invention.

The lever 10, in the embodiment shown in FIG. 4 or FIG. 3, is fabricated of insulating plastic and sprayed onto the end of the shaft 7. This shaft 7 is supported in plastic sleeves 29, which are inserted into the cap 24 of the housing, and is conducted out of the housing, where at the other end it is firmly connected to the actuating lever 4. The actuating lever 4, with a ball head 30 at one end, engages a groove 31 of the adjusting device 1.

A particularly advantageous embodiment of the displacement pickup 2 in accordance with the invention is attained because of its fastening and positional association with respect to the adjusting device and because it is possibile to perform adjustment without having to open the cap of the housing. To this end, a cylindrical tang 32 is formed on the housing and is insertable into and displaceable in a corresponding, fitting bore 33 of a wall 34. This wall 34 may be the wall of a fuel injection pump, in the interior of which there is fuel or oil. If the interior of the pump is not completely filled with fuel or oil, then a fog of fluid may form there during fuel injection pump operation, which would be capable of interfering with the function of a displacement pickup of the potentiometer type. The housing 21 of the displacement pickup according to the invention, however, is tightly sealed by the cap 24, and the passage of the shaft 7 through the cap is also effected tightly, for instance by means of an O-ring 35.

The bore 33 is a through bore through the wall 34, so that here again the inserted end of the tang 32 is advantageously provided with an O-ring 36, which assures appropriate sealing.

The cylindrical tang 32 has a longitudinal bore 38, which has an internal thread and discharges into the interior of the housing 21. The outermost end of the cylindrical tang has a slit 39, which permits the tang to be spread apart toward the outside.

A screw 41 is threaded into the thread of the longitudinal bore 38, protruding with its end into the interior of the housing 21 and there supporting the slide member 28. By rotating the screw 41 with the aid of a tool introduced into the longitudinal bore 38, the contact means 15 can now be displaced on the resistance path 12, without the housing of the displacement pickup 2 or of the fuel injection pump having to be opened. Instead of the slide member 28, a variable resistor embodied in some other way may naturally also be used. Besides this multiplicative adjustment effected with the aid of the contact means 15, an additive adjustment can also be effected with the described embodiment; in that case the orientation of the shaft 7 can be varied in the direction of displacement x of the adjusting device. The cylindrical tang 32 is displaced in the bore 33 and fixed in its desired position by threading a screw 42 into the bore 38; the screw 42 has a conical head 43 that when the screw 42 is inserted spreads apart the slit end of the cylindrical tang. To protect against contamination, the outer end of the through bore 33 may be closed with a closure cap 44.

In order to prevent the housing 21 from rotating about the axis of the cylindrical tang 32 when it is displaced, the housing is additionally guided, for instance by a pin 46. This is preferable to a solution in which the tang is embodied in prismatic form or has a guide groove, because in these latter cases there are greater problems with sealing.

With the apparatus described herein, a displacement pickup can advantageously be realized with a small structure, which is suitable for installation in spaces that are highly likely to experience oil or fluid fogs. In an advantageous manner, however, the displacement pickup can be adjusted from outside this space. This provision reduces the expense for servicing and also decreases the likelihood of malfunctioning of the displacement pickup. The displacement pickup according to the invention unites the structural advantages of a rotary potentiometer with the advantages of a displacement pickup that measures a linear variable.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A displacement pickup for detecting positions of an adjusting device of fuel injection pumps, comprising a housing which receives said adjusting device, a through bore in a wall of said housing, a movable pickup part actuated by said adjusting device and a stationary pickup part disposed on a carrier, a tang disposed on said carrier in which the tang is displaceable in said through bore in said wall of the housing which receives the adjusting device and said tang is flexible therein.

2. A displacement pickup as defined by claim 1, in which the tang is slit on its outer end oriented toward the outside of the housing and is fixable in a predetermined relationship of the carrier to the adjusting device by means of a conical clamping piece introduced into the slit in said tang from outside.

3. A displacement pickup as defined by claim 2, in which the tang has a longitudinal through bore provided with a thread, into which a screw with a conical end section is insertable from outside the housing.

4. A displacement pickup as defined by claim 3, in which the tang is embodied cylindrically and the carrier is secured against twisting by a guide means provided on the housing and which permits longitudinal displacement of the tang.

5. A displacement pickup as defined by claim 2, in which the tang is embodied cylindrically and the carrier is secured against twisting by a guide means provided on the housing and which permits longitudinal displacement of the tang.

6. A displacement pickup as defined by claim 4, in which the displacement pickup is disposed in an at least partially fluid-filled space inside the housing and the tang is sealed off from the outside in the through bore.

7. A displacement pickup as defined by claim 1, in which a setting device is provided on said stationary displacement pickup part and actuatable through the longitudinal through bore in the tang, by means of which an adjustment of a signal emitted by the displacement pickup can be accomplished, by said setting device.

8. A displacement pickup as defined by claim 7, in which the stationary pickup part has a resistance path disposed on the carrier, which path is at least part of a resistance course connected between contact poles of a voltage source and is in contact with a wiper, in which said wiper at least partially embodies a movable pickup part and at which a voltage corresponding to the position of the adjusting device can be picked up, and a lever, said lever carrying the wiper, and the resistance course and said lever are disposed in a fluid-tight pickup housing, the lever is seated on a shaft that is guided tightly through a cap of the pickup housing and on the outer end has an actuating lever, which can be coupled with the adjusting device.

9. A displacement pickup as defined by claim 8, in which the effective total resistance of the resistance course is variable by means of said setting device on the displacement pickup.

10. A displacement pickup as defined by claim 9, in which the setting device comprises a wiper adjustable on the resistance path, which wiper is one of the contacts defining the effective resistance course.

11. A displacement pickup as defined by claim 10, in which the longitudinal bore is embodied as a threaded bore in the cylindrical tang, in which bore a screw can be fully rotated, while its end is projecting into the interior of the housing and coupled with the wiper.

12. A displacement pickup for detecting positions of an adjusting device of fuel injection pumps, comprising a movable pickup part actuated by the adjusting device, a carrier and a stationary pickup part disposed on said carrier, which stationary part has a resistance path disposed on the carrier, which resistance path is at least part of a resistance course connected between contact poles of a voltage source and is in contact with a wiper which wiper at least partially embodies the movable pickup part and at which a voltage corresponding to a position of the adjusting device can be picked up, in which the adjusting device executes a linear movement by means of which, a lever that is pivotable about a pivot point and carries said wiper can be actuated, a coupling for actuating said wiper and the resistance path is embodied as a path having a linear course located in a pivoting range of the wiper.

13. A displacement pickup as defined by claim 12 which includes a fluid tight housing in which the resistance course and the lever carrying the wiper are accommodated, a shaft which is tightly guided through a cap of the housing on which said lever is disposed and which the outer end of said shaft has an actuating lever which can be coupled with the adjusting device.

14. A displacement pickup as defined by claim 12 in which the resistance path is made of conductive plastic and is disposed on a carrier plate of insulating material.

15. A displacement pickup as defined by claim 14, in which next to the resistance path is disposed a contact path, which is connected with the wiper and serves to further conduct the voltage picked up at the resistance path.

16. A displacement pickup as defined by claim 15, in which the connection conductor of the contact means of the resistance path and the contact path are cast integrally with the carrier plate.

17. A displacement pickup as defined by claim 14, in which the lever carrying the wiper is made of non-conductive plastic and is sprayed onto the shaft.

18. A displacement pickup as defined by claim 12, in which the displacement pickup includes a housing which is disposed in an at least partially fluid-filled space receiving the adjusting device, and for securing purposes the housing has a cylindrical tank, which is tightly displaceable in a through bore of a wall defining this space and is fixable therein.

19. A displacement pickup as defined by claim 18, in which the cylindrical tang is slit at its outermost end and by means of a conical clamping piece introduceable therein from outside the space is fixable in a predetermined relationship of the housing to the adjusting device.

20. A displacement transducer as defined by claim 18 in which the cylindrical tang has a longitudinal bore discharging into the interior of the housing, through which bore an adjusting device is actuatable, by means of which device the effective total resistance of the resistance course is variable.

21. A displacement pickup as defined by claim 20, in which the adjusting device comprises a wiper contact displaceable on the resistance path, which wiper contact is one of the contacts of the resistance course.

22. A displacement pickup as defined by claim 21, in which the longitudinal bore in the cylindrical tang is embodied as a threaded bore in which a screw can be fully rotated, with an end that protrudes into the interior of the housing which couples the wiper contact thereto.

23. A displacement pickup as defined by claim 22, in which a clamping screw with a conical head is threadable into the threaded bore in order to fix the cylindrical tang.

24. A displacement pickup as defined by claim 18, in which the through bore is tightly closable from the outside by a closure cap.

* * * * *